United States Patent [19]

Tidd

[11] 4,051,488

[45] Sept. 27, 1977

[54] PHOTOTYPESETTING MACHINE

[75] Inventor: James Alfred Tidd, Haverhill, Mass.

[73] Assignee: Alphatype Corporation, Skokie, Ill.

[21] Appl. No.: 631,419

[22] Filed: Nov. 12, 1975

[51] Int. Cl.[2] .............................................. G03B 15/16
[52] U.S. Cl. ....................................................... 354/13
[58] Field of Search ................................ 354/5, 11-17

[56] References Cited

U.S. PATENT DOCUMENTS

| | | | |
|---|---|---|---|
| 3,099,945 | 8/1963 | O'Brien | 354/13 |
| 3,308,732 | 3/1967 | Raak et al. | 354/14 |
| 3,695,155 | 10/1972 | Guldenpfennig | 354/11 |
| 3,721,174 | 3/1973 | Tidd | 354/13 |
| 3,733,977 | 5/1973 | Morgan | 354/15 UX |
| 3,791,271 | 2/1974 | Nishikawa | 354/13 |
| 3,886,566 | 5/1975 | Moyroud et al. | 354/15 |
| 3,946,294 | 3/1976 | Scholten | 354/13 X |

*Primary Examiner*—Donald A. Griffin
*Attorney, Agent, or Firm*—Sixbey, Bradford & Leedom

[57] ABSTRACT

The phototypesetting machine of this invention includes a character carrier bearing a group of characters arranged for projection by a projection unit. The character carrier is driven at a constant speed so that the characters move consecutively past the projection unit. Position marks and width marks are placed on the character carrier to control the projection of the characters and to provide the width information necessary to set the characters. The character carrier as segmented into replaceable sections, each section bearing at least one distinct alphabet or character group with the width information therefor.

47 Claims, 10 Drawing Figures

FIG.7
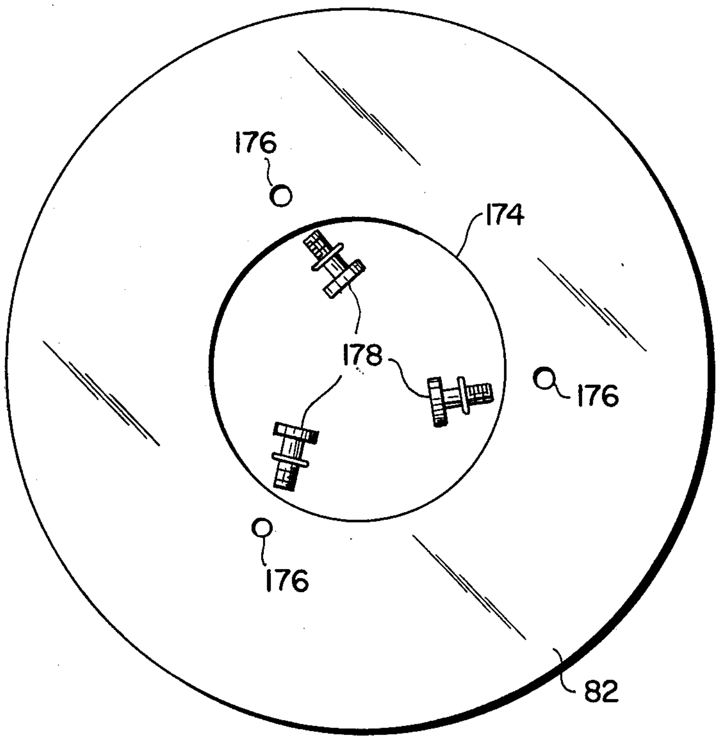
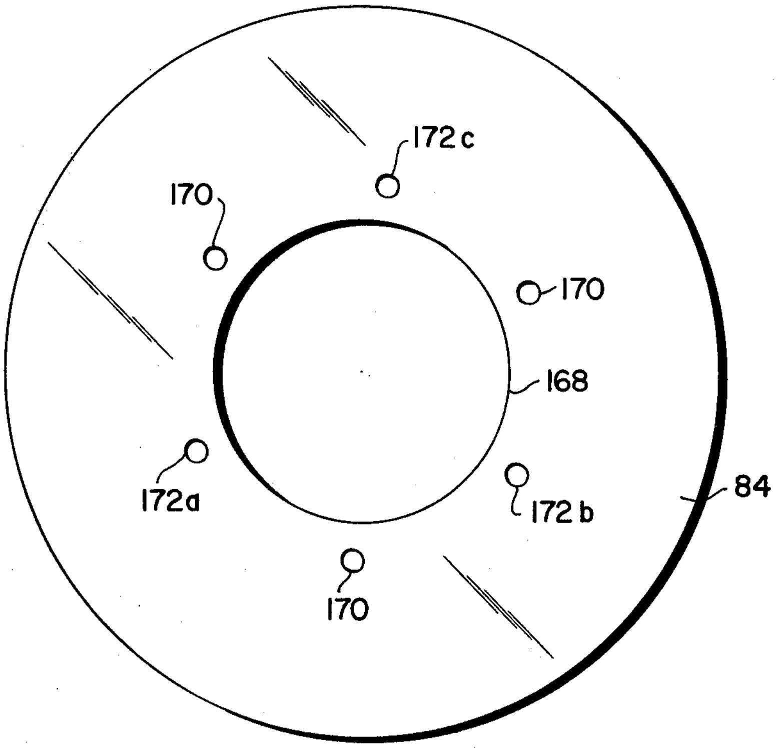
FIG.6

PHOTOTYPESETTING MACHINE

BACKGROUND OF THE INVENTION

Phototypesetting machines are generally complex, expensive units requiring highly skilled operators to accomplish a number of complicated procedures during a typesetting operation. Such machines often employ computers or special circuit cards to provide character width information and other control information. Often a number of separate typefonts must be selected and the proper machine settings or circuit cards chosen for each font. An error in any of the numerous steps required to set up and subsequently operate such machines is likely to result in an abortive typesetting operation.

A tremendous need has arisen for a simple, inexpensive phototypesetting machine that may be operated by anyone having normal typing skills. Such a machine would make phototypesetting available to schools, small businesses, small trade journals and newspapers, and other organizations to which phototypesetting has previously been denied by the price and complexity of the equipment.

Applicant has designed a very simple, compact and inexpensive typesetting machine which employs a novel rotating disc typefont. Basically, phototypesetting machines employing rotating disc typefonts are very well known in the art. A number of early patents to Rene Higgonnet and Louis Moyroud disclose phototypesetting machines using rotating disc typefonts which are driven between flashlamp and lens assemblies. The flashlamp and typefont may be mounted on a carriage which moves relative to a photosensitive receiving medium and the photosensitive receiving medium is then driven in a direction normal to the direction of carriage movement. These known phototypesetting machines generally employ a disc typefont having characters arranged in a circle spaced from the center of the font. These characters are located by means of a circular arrangement of timing marks with one mark being provided for each character.

Disc typefonts have been developed which bear a plurality of different alphabets or character groups, but invariably, these alphabets are arranged in concentric circles on a unitary font. A problem arises when it becomes desirable to employ one or two alphabets on a font in combination with a plurality of third alphebets, for this requires the frequent substitution of a plurality of discs. Generally separate character width information must be preset in some manner for each disc used, thereby rendering the operation quite complex. In the past, some attempts, have been made to code width information on a disc typefont, but since the font is rotating at a high speed, effective coding has been difficult. For example, U.S. Pat. No. 3,695,155 to Hans Guldenpfenning discloses a disc typefont for a phototypesetting machine which includes a width slot for each character. However to sense width from such width slot, it is necessary to stop the rotation of the disc and scan the width slot while the disc is stationary. This is an extremely slow process.

It is a primary object of the present invention to provide a novel and improved phototypesetting machine which is compact, simple to operate and inexpensive.

It is another object of this invention to provide a novel and improved phototypesetting machine incorporating a rotating disc typefont which facilitates the mixing of a plurality of alphabets or different character groups and directly provides size and width information to the machine without requiring operator selection.

A further object of the present invention is to provide a novel and improved phototypesetting machine incorporating a rotating disc typefont having character timing marks and a width code on the font; such machine being adapted to employ the timing marks and width code to derive width information from the font as the font rotates at high speed.

A still further object of the present invention is to provide a novel and improved phototypesetting machine incorporating a rotating disc typefont having removable sectors and a novel mounting assembly for such typefont.

These and other objects of the present invention will be readily apparent from a consideration of the following specification and claims taken in conjunction with the accompanying drawings in which:

FIGS. 6 and 7 are plan views of transparent mounting discs for use with the typefont of FIG. 4;

Figure 1:
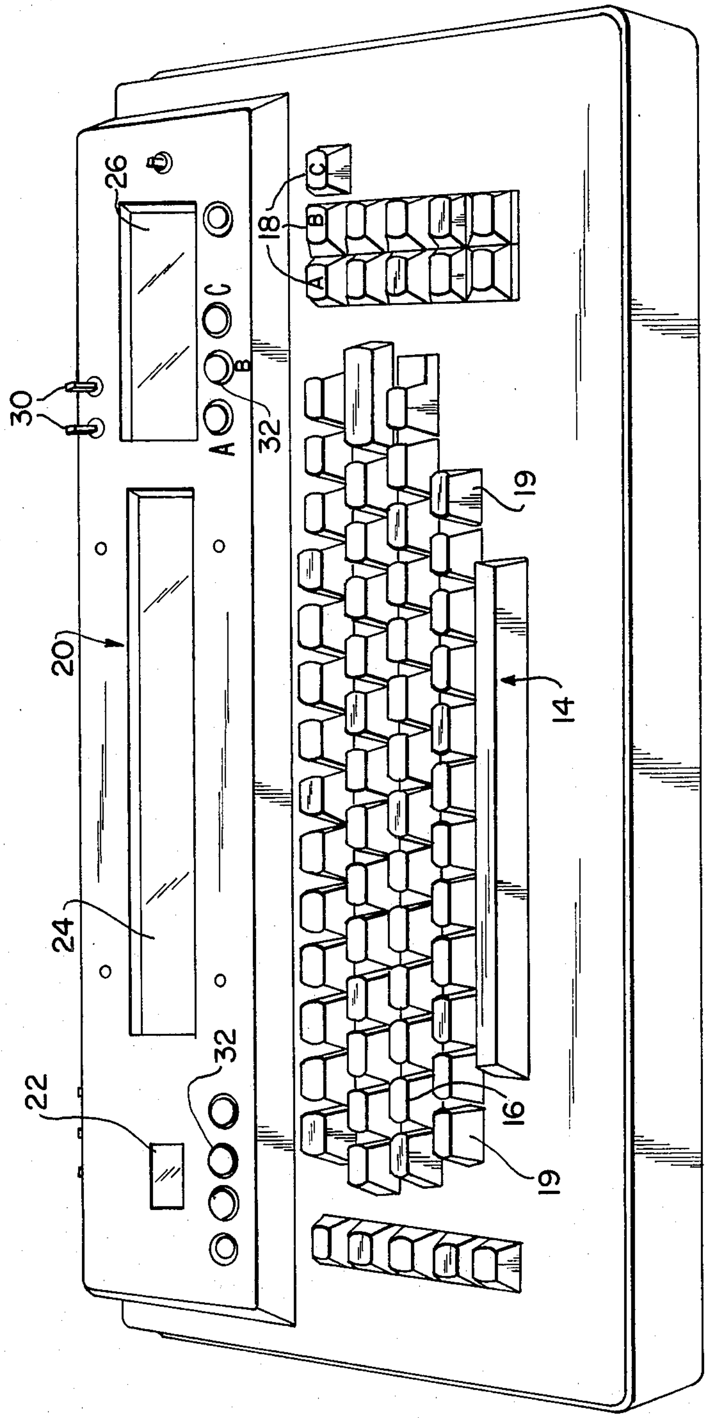
FIG. 1 is a perspective view of the keyboard input unit for the phototypesetting machine of the present invention.
Figure 2:
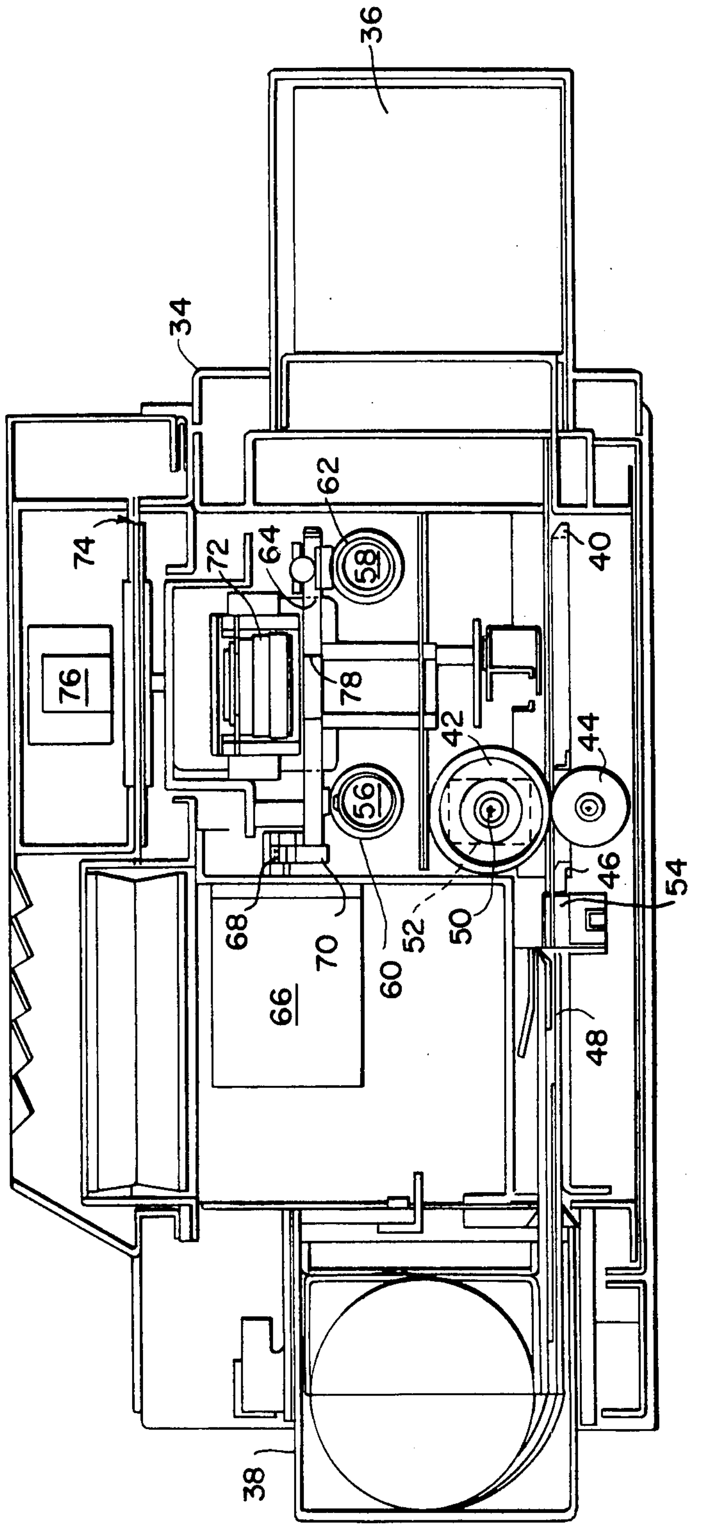
FIG. 2 is a sectional view of the output typesetter for the phototypesetting machine of the present invention.

Referring now to the drawings, the phototypesetting machine of the present invention includes a compact keyboard input unit 10 which is connected by means of a cable to a compact output typesetter 12. Operator control of the phototypesetting machine is accomplished with the input unit 10 which includes a keyboard 14 provided with a number of character keys of which key 16 is illustrative and a number of function control keys for controlling various machine operations. Among the function control keys are font control keys 18 which select one of three alphabets or character groups.

The character key group contains a number of keys conventional to typewriter and typesetting machine keyboards such as shift keys 19 to select upper case letter or characters in upper case positions. These conventional keys will not be described in detail as their functions are well known.

The keyboard input unit also includes an automatic information display panel 20 having three display panels 22, 24 and 26. The panels 22 and 26 display information such as line length, space remaining, number of lines set, tabular column number and word space in the line, while the panel 24 includes a 32 digit display to display each character and typographic function as actually keyboarded. Additionally a number of control switches 30 and indicator lights 32 are also provided.

The output typesetter 12 operates in response to the input unit 10 to project selected characters onto a photosensitive receiving medium. This typesetter includes a housing 34 which mounts a removable film box 36 and a removable film cassette 38. Unexposed photosensitive web material from a roll in the film box is fed through film guide 40, between rollers 42 and 44, through a film guide 46 and into an inlet film guide 48 for the film cassette 38. The web is driven by the roller 42 which is mounted on the shaft 50 of a stepper motor 52. This stepper motor is activated by the control logic for the typesetter 12 at the end of each composed line, and when activated, the stepper motor drives the web to set the space between composed lines of characters.

The roller 44 is a pressure roller which operates to maintain the photosensitive web material in contact with the drive roller 42. The pressure and drive rollers pass the web through a cutter assembly 54 which is mounted between the guides 46 and 48. When activated, the cutter assembly will operate to sever the exposed web material in the cassette 38 from the remaining unexposed web material.

Two elongated carriage mounting bars 56 and 58 extend in parallel spaced relationship across the housing 34 in a direction perpendicular to that of the film guides 40, 46 and 48. These mounting bars support carriage mounts 60 and 62 which are secured to the underside of a carriage 64 and are mounted to slide along the mounting bars 56 and 58. Thus the carriage 64 slides in a direction transverse to the longitudinal axis of the film extending between the film box 36 and cassette 38.

The carriage 64 is driven along the mounting bars 56 and 58 by a stepping motor 66 having a drive gear 68 which meshes with a rack gear 70 secured along one side of the carriage. Each step of the stepping motor 66 is equal to a size increment for the type characters to be set. For example, one step of this stepping motor may equal a one half point increment. Thus, by means of the stepping motor 66, the carriage may be traversed for each new character set in accordance with the size of the character and to determine the space between characters and words. The carriage is provided with a carriage return mechanism of known type (not shown) to return the carriage to an initial starting point when the carriage return is activated.

A projection lens system 72 is secured to the carriage 64 in combination with a font assembly 74 and a flash unit 76. The bottom of the carriage is provided with an opening 78 so that characters projected from the font assembly by the flash unit may be directed by the lens system onto the film.

Figure 3:
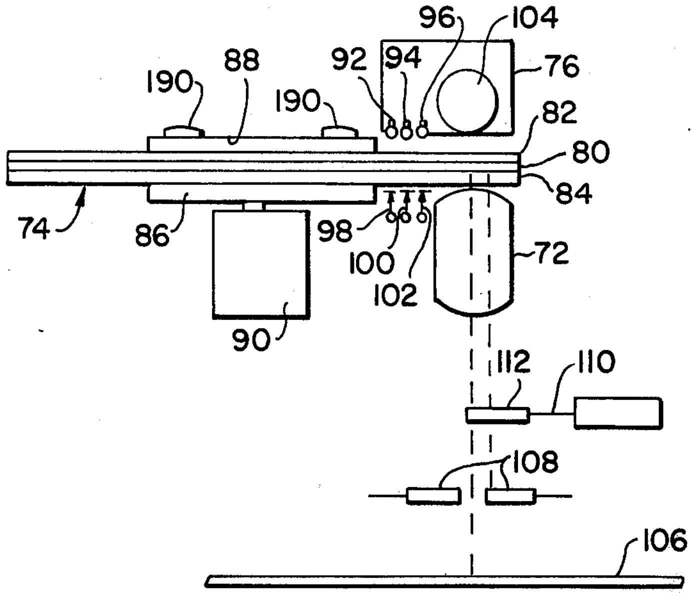
FIG. 3 is a diagrammatic view of the optical system for the phototypesetting machine of the present invention.

The optical system for the output typesetter 12 may best be understood by referring to FIG. 3 wherein the font assembly 74 includes a disc shaped film font 80 which is sandwiched between two transparent mounting discs 82 and 84. This combination is supported by a disc mount 86 and held in place by a disc retainer 88. The disc mount is driven by a synchronous motor 90 so that the font 80 is rotated continuously beneath the flash unit 76 at a uniform controlled speed.

The flash unit includes three exciter lamps 92, 94 and 96 which are aligned with three phototransistors 98, 100 and 102 mounted beneath the font 80. Also the flash unit includes a flashlamp 104 which causes characters from two rows on the font to be simultaneously projected by the projection lens system 72. Only a character from one of the rows reaches the sensitized surface of the film 106, for the projection of the remaining character is blocked by a shutter unit 108. This shutter unit may be solenoid operated or otherwise operated in known manner to pass only one of the projection paths from the projection lens.

It is often desirable to include a character positioning unit 110 in the optical system for the output typesetter 12. As previously indicated, the stepping motor 66 transverses the carriage 64 in accordance with the size of a character to be set. However, this stepping motor moves the carriage in equal increments, and thus does not permit a character to be positioned on the set line in a manner other than that governed by the set increments of the stepping motor. The character positioning unit 110 operates to optically move a character either right or left on the set line for a small distance which is only a desired fraction of the set increments provided by the stepping motor 66. This is accomplished by selectively inserting a glass flat 112 into the optical path between the lens system 72 and the sensitive film 106. This glass flat may be reciprocated or rotated by a solenoid or other suitable drive unit and is formed to optically divert the character projected from the lens system either right or left on the set line from the position where the character would be set without the intervention of the glass flat. The direction and magnitude of this optical diversion or repositioning of the character is determined by the portion of the surface of the glass flat which is moved into the optical character projection path. The glass flat is formed in known manner to provide these incremental position changes. It is very important that the glass flat be formed in such a manner that it does not alter in any manner the size of the projected character and thus the point size of the character set on the film 106. The glass flat therefore alters only character position.

Figure 4:
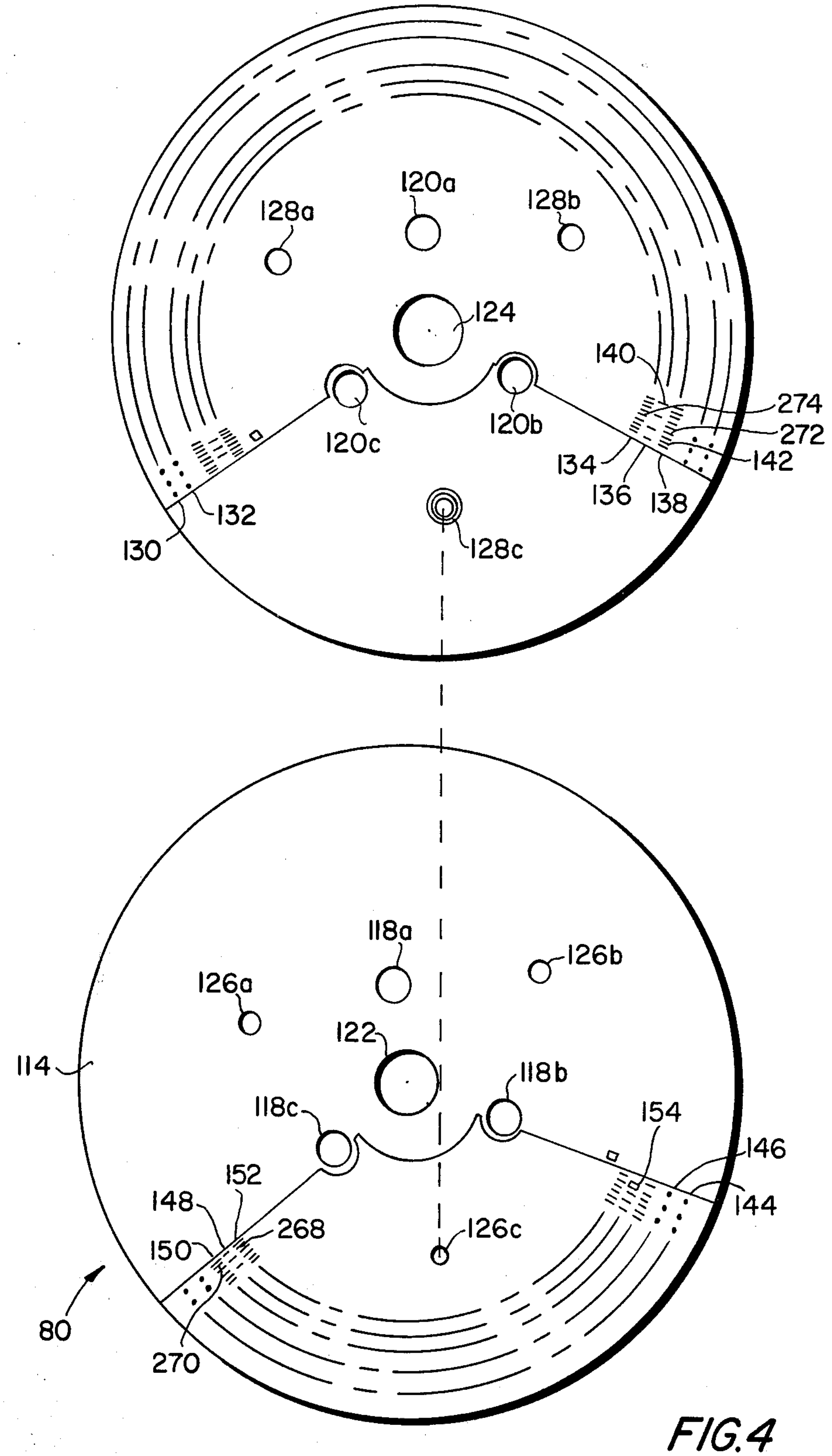
FIG. 4 is a plan view of a disc typefont for the phototypesetting machine of the present invention.
Figure 8:
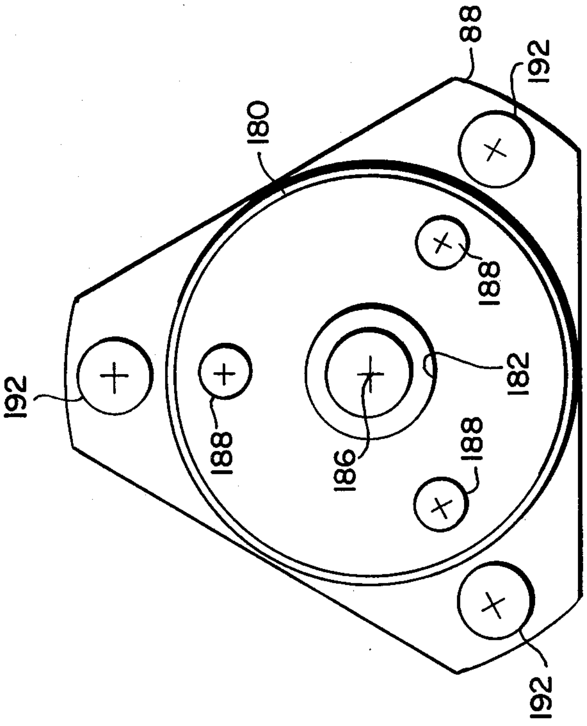
FIG. 8 is a plan view of a disc retainer for use with the disc mount of FIG. 5.

The disc shaped film font 80 is formed from two superimposed discs 114 and 116 as illustrated in FIG. 4. These discs are of equal diameter, and each is formed with three mounting holes **118*a*, 118*b* and 118*c* and 120*a*, 120*b* and 120*c* spaced equally relative to a center mounting hole 122 and 124. Also equally spaced from the center mounting hole of each disc and positioned between adjacent mounting holes are three locking holes 126*a*, 126*b* and 126*c* and 128*a*, 128*b* and 128*c*.**

The disc 116 carries two different alphabets or character groups 130 and 132 arranged to form two spaced concentric arcs having a center which is the center of the disc. In a manner conventional to such film fonts, the characters are arranged on an opaque background and are formed to pass light from the flashlamp 104.

There are an equal number of characters in the character groups 130 and 132 and the characters in each group are preferably spaced equally from one another to form an arc equal to approximately 240° to a circle drawn about the center of the disc 116. Two adjacent characters in the respective groups 130 and 132 are spaced along a radial line from the common center of the concentric arcs. Each 240° arc contains a complete alphabet or character group required to form a complete font, and thus two fonts A and B are formed on the disc 116.

Between the center of the disc 116 and the innermost group of characters 132 are three concentric spaced arcs 134, 136 and 138 containing a plurality of light transmitting, radially arranged code marks. Again, each of the arcs 134, 136 and 138 extends for approximately 240° of a circle formed about the center of the disc 114.

The center arc 136 contains a number of equally spaced timing marks 140 which provide pulses in a manner to be described to control the triggering of the flashlamp 104 and the illumination of characters in the groups 130 and 132. Each timing mark 140 is positioned relative to a corresponding pair of adjacent characters in the groups 130 and 132 so that the flashlamp will be triggered to illuminate this character pair when the character pair is in a projection position above the lens system 72. The use of such equally spaced timing marks to control character projection is well known in the art dealing with disc type photocomposing machines.

The arcs 134 and 136 provide the width code for the characters in the groups 132 and 130 respectively. Thus for each character in the outer group 130, there are two width code lines 142 slightly preceeding the character, and the spacing between these width code lines is indicative of the width information necessary to set the corresponding character. The width code lines in arc 134 operate in an identical manner for corresponding characters in the group 132. Thus, all character width and size information is automatically programmed by the type font.

The disc 114 is employed to complete the type font 80, and this disc carries two arcuate groups of characters 144 and 146 forming arcs having a radius equal to that of the arcs 130 and 132 respectively. The characters within the groups 144 and 146 are relatively spaced in a manner identical to the spacing for the characters within the groups 130 and 132, and thus, when the discs 114 and 116 are superimposed, the character arcs 130 and 132 mate respectively with the character arcs 144 and 146 to form two concentric circles about the center of the superimposed discs. Thus, the character groups 144 and 146 form arcs equal to 120° of a circle formed about the center of the disc 114, with one group containing upper case letters or characters and the remaining group containing lower case letters or characters.

The disc 114 includes an arcuate group of timing marks 148 and two arcuate groups of width marks 150 and 152 which are arranged relative to the characters in the groups 144 and 146 and operate in a manner identical to that previously discussed in connection with the timing marks 136 and width marks 134 and 138 of the disc 116. Again, the timing marks 148 and the width marks 150 and 152 form a 120° arc of concentric circles drawn about the center of the disc 114, and when the discs are superimposed, these three arcs mate with the arcs 134, 136 and 138 to form three concentric circles about the center of the superimposed discs.

The characters on the disc 114 form one complete alphabet or font with half of the characters being arranged in the arc 144 and the remaining half arranged in the arc 146. Thus, a third font C is provided by the disc 114, such third font differing from fonts A and B in that the upper and lower case characters are in separate arcs and are not mixed.

To properly form the three alphabet font 80 of FIG. 4, the discs 114 and 116 are superimposed so that the holes 120 A–C, 124, and 128 A–C are in axact alignment with corresponding holes 118 A–C, 122 and 126 A–C. When this is accomplished, arcs 130, 132, 134, 136 and 138 mate exactly with arcs 144, 146, 148, 150 and 152 to form five concentric tracks about the center of the font. The disc 114 includes an opaque section extending between two radial lines which form an angle of substantially 120° at the center of the disc and pass respectively through the centers of the holes 118*b* and 118*c*. This opaque section bears the transparent character groups 144 and 146 and the transparent marks 148, 150, and 152. The remainder of the disc 114 is transparent.

To complement the disc 114, the disc 116 includes an opaque section extending between two radial lines which form an angle of substantially 240° at the center of the disc and pass through the centers of holes 120*b* and 120*c*. This opaque section bears the transparent characters and marks for fonts A and B, and the remainder of the disc is transparent. Either disc may be superimposed on the other so that the transparent section of the top disc overlies the opaque section of the bottom disc.

It should be noted for future reference that one of the timing marks in group 148 on the disc 114 is wider than the remaining timing marks as illustrated at 154. This wide timing mark constitutes a start mark in the circle of timing marks formed by the groups 148 and 136 and indicates each time the circle of timing marks has made a revolution.

Since the character size and width information and timing for the flashlamp 104 is derived directly from the film font 80, it is extremely important that an accurate mounting structure be provided to exactly align the two disc sections 114 and 116. This mounting structure may best be understood with references to FIGS. 3–8 wherein it will be noted that the disc mount 86 has an upstanding central hub 156 of circular cross section which receives and is secured to the shaft 158 of the synchronous motor 90. Thus, the central longitudinal axis of the synchronous motor shaft forms the exact center 160 for the rotating disc mount 86.

The disc mount 86 includes a raised circular section 162 formed about the center point 160, and three threaded inserts 164 extend inwardly from the top surface of the raised section. These inserts are equally spaced from the center 160 of the disc mount, and radial lines drawn from the center of the disc mount through the center of each threaded insert form an angle of 120° at the center of the disc mount.

Figure 5:
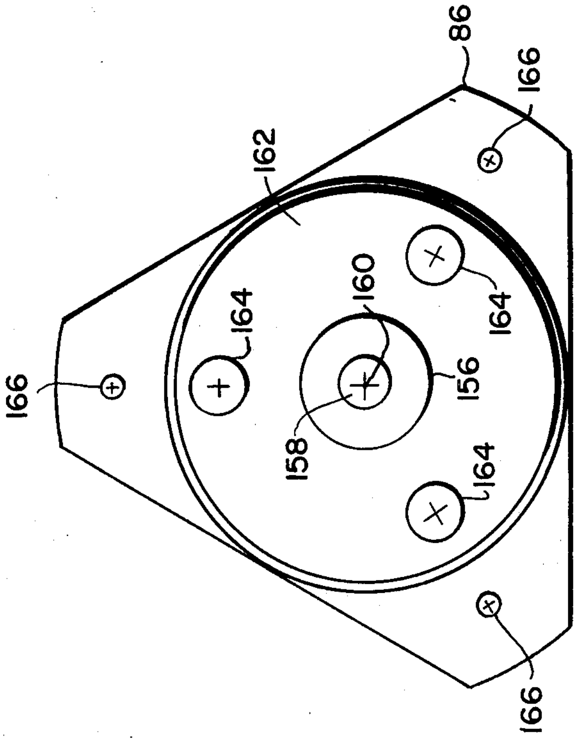
FIG. 5 is a plan view of a disc mount for the phototypesetting machine of the present invention.

As will be noted in FIG. 5, the disc mount is substantially triangular in configuration, and adjacent each corner of the triangle and outboard of the raised section 162 are three upwardly projecting pins 166. These pins are equally spaced from the center 160 of the disc mount, and each pin is aligned with an insert 164 so that the radial lines from the center of the disc mount passing through the center of the insert also pass through the center of the adjacent pin.

The disc mount 86 is designed to receive a flat, circular transparent mounting disc 84 of glass or other clear transparent material. This mounting disc has a diameter which is substantially equal to the diameter of the film font 80 and is provided with a central circular shaped aperture 168 which is dimensioned to fit snugly over the raised central portion 162 of the disc mount. The diameter of the central aperture is such that the transparent mounting disc may be easily removed from the disc mount 86.

The mounting disc 84 is provided with three holes 170 which are equally spaced from the center of the disc and which receive the pins 166. The pins 166 are of sufficient length to project very slightly above the surface of the transparent mounting disc when the mounting disc is in place on the disc mount. It should also be noted that the disc mount is provided with three threaded inserts 172A, 172B, and 172C which project for a short distance above the surface of the transparent mounting disc. These projecting threaded inserts are spaced equally from the center of the transparent mounting disc and are also spaced equally between the holes 170. It is important to note that while the projecting threaded inserts 172B and 172C are circular in configuration, the insert 172A is compressed so as to be slightly eliptical in shape.

As illustrated in FIG. 3, the film font 80 is sandwiched between the transparent mounting disc 84 and a second top transparent mounting disc 82 of similar size and shape. The top mounting disc 82 has a central circular aperture or cutout 174 which may be equal in size to the aperture 168. Additionally, the top mounting disc is provided with three holes 176 equally spaced from the center thereof to receive the outwardly projecting threaded inserts 172A–C from the transparent disc 84. Although the upwardly projecting inserts extend into the holes 176, they do not project beyond the upper surface of the top mounting disc. Thus the disc 82 and the disc 84 may be tightly locked together by locking bolts 178 which may be inserted into the holes 176 and screwed into the projecting inserts 172A–C.

The mounting assembly for the film font 80 is completed by the disc retainer 88 which is of substantially the same size and shape as the disc mount 86. This disc retainer has a central, circular raised section 180 which fits into the circular central aperture 174 of the top mounting disc 82. A central socket 182 formed on the circular section 180 is provided for receiving the hub 156. Again, as in the case of the disc mount 86, the central longitudinal axis of the synchronous motor shaft is at the center 186 of the disc retainer 88.

Extending through the disc retainer 88 are three openings 188 equally spaced from the center 186 and positioned to overlie and correspond with the threaded inserts 164 in the disc mount 86. These openings 188 are adapted to receive threaded locking screws 190 which are threaded into the inserts 164. Aligned with the openings 188 and also with the pins 166 of the disc mount are three resilient pads 192 secured to the surface of the disc retainer.

To properly mount and assemble the film font 80, the locking hole 128C for the disc 116 may be slipped over the projecting elliptical insert 172A from the transparent mounting disc 84, and then disc 114 is superimposed thereon by slipping the locking hole 126C over the eliptical insert. It will be noted in FIG. 4 that the locking holes 128C and 126C are circled for identification. With the projecting elliptical insert 172A extending through the locking holes 128C and 126C, the font disc 114 and 116 may be easily positioned so that the remaining projecting inserts 172B and 172C project through the locking holes 126B and 128B and 126A and 128A respectively. Now the superimposed film discs 114 and 116 are roughly positioned on the transparent mounting disc 84, and the top transparent mounting disc 82 may be placed over the superimposed font discs by inserting the projecting inserts 172A–C into the holes 176. Since the locking holes 126A–C and 128A–C are slightly larger in diameter than the diameter of the projecting inserts 172A–C, the superimposed font discs are permitted to move slightly between the mounting discs 82 and 84. This ability for slight movement is retained while the transparent mounting discs are initially secured together by threading the lock bolts 178 through the holes 176 and into the inserts 172A–C. However, the lock bolts should not be initially tightened to an extent where the slight movement of the font between the transparent mounting discs is prevented.

With the font 80 loosely secured between the transparent mounting discs 82 and 84, the complete assembly is now inserted onto the disc mount 86 so that the central hole 168 of the transparent mounting disc 84 fits over the raised circular section 162. The central hub 156 of the disc mount extends through the central holes 122 and 124 of the discs 114 and 116, and the diameter of the holes 122 and 124 is formed to closely match the diameter of the central hub. It is this central hub which accomplishes the final accurate alignment of the two font discs, and this alignment is facilitated by the pins 166 which extend through the holes 170 to contact and support the lower surface of the bottom most font disc. Since the font discs are supported by the minimum frictional surface presented by the upper ends of the pins 166, these discs float relative to the surface of the transparent mounting disc 168 into exact alignment. The elliptical projecting insert 172A permits the font discs to move easily into alignment over the central hub 156.

With the font discs now in alignment, the lock bolts 178 are tightned to sandwich the fonts securely between the transparent mounting discs 82 and 84. The pins 166 position the font discs in a very specific plane, and the transparent mounting discs maintain the font discs in a very flat configuration in this plane. Once the lock bolts 178 are tightened, the disc retainer 88 is positioned so that the central hub 156 projects into the socket 182. The bolts 190 are then inserted into the holes 188 and through the holes 118A–C and 120A–C in the font discs so that they may be screwed into the threaded inserts 164 in the disc mount 86. As these bolts are tightened, the pads 192 press downwardly on the top transparent mounting disc 82 over the ends of the pins 166, and the complete font mounting assembly is now tightly secured in aligned relationship for rotation by the synchronous motor 90.

Referring now to FIGS. 1, 3, 4 and 9, the type font 80 is normally rotating at a high and continuous speed controlled and driven by the synchronous motor 90. Characters thus pass continuously and in sequence by the projection position between the flashlamp 104 and the lens 72, while timing marks pass between the lamp 94 and the photodiode 100. The character width marks pass between the lamps 92 and 96 and the photo diodes 98 and 102 respectively. To print a character from the rotating font, one of the font select keys 18 on the keyboard input unit 10 must be depressed to choose either the A, B or C font on the type font 80. Once this choice is made, the indicator light 32 is lit, and characters will be printed from this font until another font selection is made.

Figure 9:
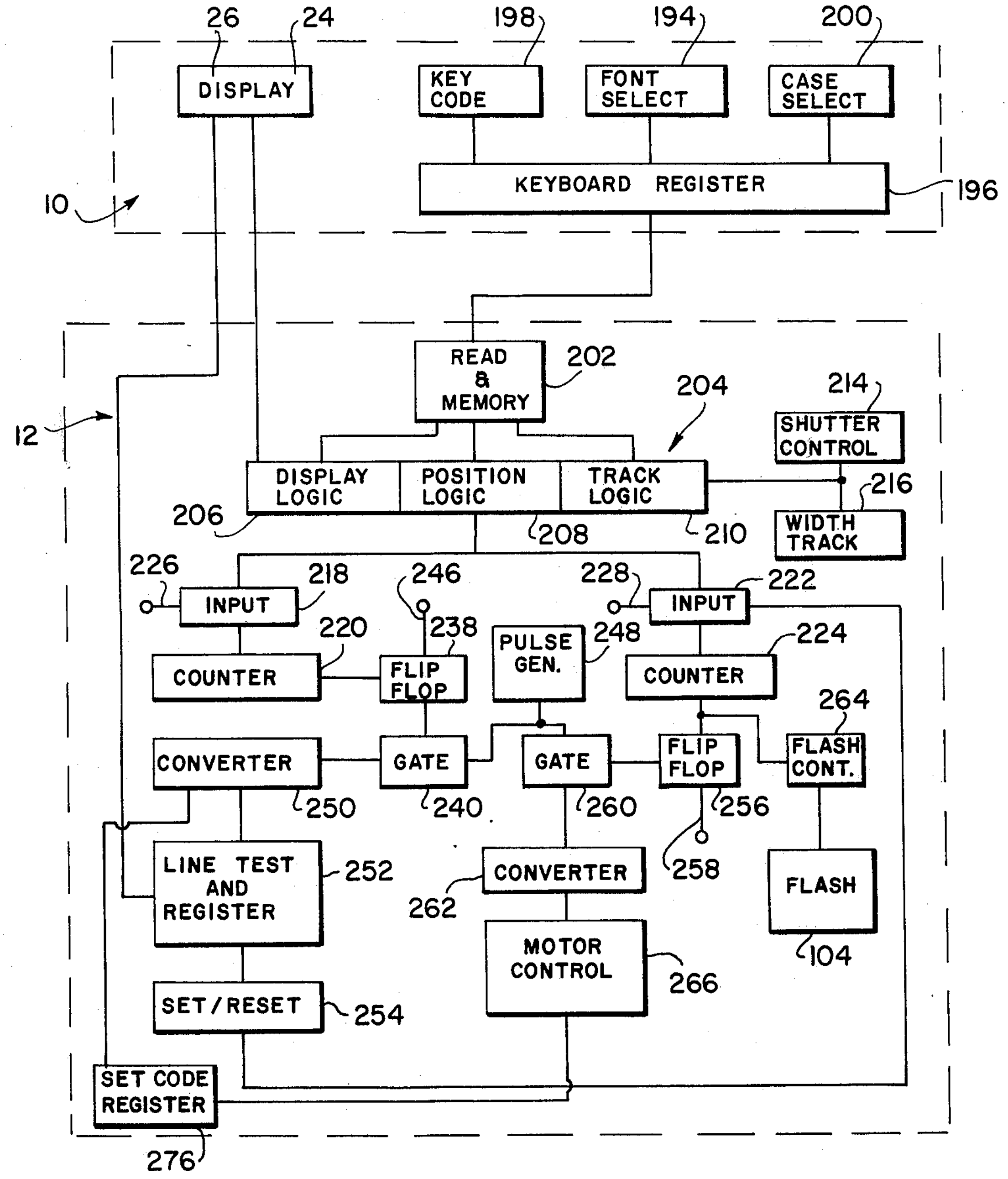
FIG. 9 is a block diagram of the control circuit for the phototypesetting machine of the present invention.

In selecting characters, the character key 16 may be depressed and, if an upper case letter or character is required, the shift key 19 will also be depressed. Each character key for the keyboard input unit 10 has a specific key code generator which generates a code unique to that key, and similarly, the font select keys 18 and the shift key 19 also provide a unique output code. Thus, as illustrated in FIG. 9, the selection of a font causes a font select code generator 194 to provide a font identification code to a keyboard register 196. Similarly, when a character key 16 is depressed, a key code generator 198 for that key provides a key code to the keyboard register. Should an upper case character or letter be desired, depression of the shift key 19 causes a key select generator 200 to provide an upper case code to the keyboard register 196.

The output typesetter unit 12 includes a read and memory section 202 to read the code information from the keyboard register 196. This information is used as an address to obtain coded information from memory indicative of the character to be displayed, the position of the character on the type font 80, and the track on the type font 80 bearing the character and the width code for the character. This code information is then stored in the unit 202 for subsequent sequential readout.

The keyboard register 196 operates as a first buffer for input material while the read and memory unit 202 operates as a second buffer for information to be subsequently employed by the output typesetter unit 12. Thus, for example, a new line of information may be continuously input from the keyboard input unit 10 while a previous line is being printed by the output typesetter 12. Also, with all three fonts on the typefont 80, the key code, font select and key select information is necessary to address the read and memory unit 202. In the case of the A and B fonts of FIG. 4, the font select code taken alone indicates which track will contain the character, while the case select code or absence thereof combined with the key code access the position and display code for the character. In the case of the C font, however, the font select and the presence or absence of a case select code are necessary to determine what track contains the character, while the key code accesses the character position and display code.

Information from the read and memory section 202 is sequentially read out by a readout logic unit 204, which, for purposes of illustration, is divided into a display logic section 206, a position logic section 208, and a track logic 210. Each of these sections operates with a portion of the code provided by the read and memory unit 202 to control the typesetting operation of the output typesetter unit 12. For example, the display logic section 206 reads the character display code accessed from the read and memory unit 202 and drives the display 24 on the keyboard unit 10 to display the selected character. The track logic section 210 determines from the code derived from the read and memory unit 202 the proper tracks on the type font 80 which contain the character to be set and the width code for the character. Also, the track logic unit activates a shutter control 214 which positions the shutter 108 so that characters in the selected character track on the type font 80 may be projected while the optical path from the track other than the selected track is blocked. Finally, the track logic section 210 simultaneously activates a width track control unit 216 which causes an output to be provided from either the photo diode 98 or the photo diode 102. This width track control unit may be a simple switch to selectively activate either the lamp 92 or 96 or, should the lamps be continuously activated, to complete an output circuit from either the photo diode 98 or the photo diode 102.

The position logic section 208 derives a position code from the read and memory unit 202, and this position code is provided to the input logic 218 for a counter 220 and also to the input logic 222 for a counter 334. The counters 220 and 224 constitute traditional down counters or complement counters which are preset to a certain input and which then respond to input pulses to count to zero.

The input logic 218 has an input 226 which is connected to the output of the photo diode 100, while the input logic 222 includes an input 228 which is also connected to the output of the photo diode 100. Thus, the timing pulses provided by the photo diode 100 from the timing tracks 148 and 136 of the font 80 are provided to the input logic sections 218 and 222 for the counters 220 and 224.

Once the input logic 218 has set the position code for the desired character into the counter 220, the passage of the wide timing pulse 154 between the exciter lamp 94 and the photo diode 100 causes an output pulse from the photo diode having a pulse width which is greater than the pulse width of the remaining timing pulses. This wide pulse is sensed by the input logic 218 and is employed to prepare the counter 220 for subsequent counting. Upon the passage of the wide pulse from the timing mark 154, the counter 220 begins to count the pulses resulting from the subsequent timing marks until the counter is zeroed.

Figure 10:
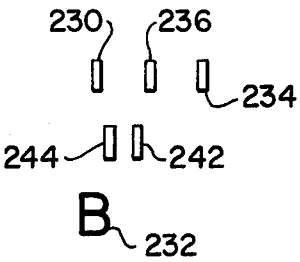
FIG. 10 illustrates the timing mark, width code relationship for characters on the typefont of FIG. 4.

The position code set into the counter 220 is designed to cause the counter to zero in response to a timing mark which is the second mark preceeding the timing mark which will result in projection of the character. This can best be understood by reference to FIG. 10 wherein a timing mark 230 is shown as the timing mark which will initiate projection of the character 232. Therefore, a timing mark 234 which is the second mark preceding the mark 230 is the timing mark which zeroes the counter 220. After the counter 220 has been zeroed, the next subsequent pulse caused by a timing mark 236 is an overflow pulse which activates a flip flop 238 so that the flip flop can pass pulses to a gate 240. The timing mark 236 initiates the character width measurement accomplished by the output typesetter unit 12, and it will be noted that width marks 242 and 244 for the character 232 are provided between the timing marks 230 and 236. The flip flop 238 is provided with an input terminal 246 which is connected to sense the outputs from both the photo transistors 98 and 102. However, since the width track unit 216 has previously selected and activated the output circuit for one width track only, the terminal 246 will receive an output from only one of the photo transistors 98 or 102 at any given time.

Once the flip flop 238 is activated, the width mark 242 will cause the selected photo transistor circuit to provide an output pulse to the terminal 246 which is passed by the flip flop 238 to activate the gate 240. When the gate is activated, pulses from a pulse generator 248 pass through the gate to a converter 250. The gate is closed by the reception from the photo transistor of a pulse caused by the width mark 244, and at this point the converter has received a number of pulses indicative of the width between the width marks 242 and 244. The second overrun pulse to the counter 220 provided by the timing mark 230 operates to deactivate the flip flop 238.

The converter 250 operates to convert the pulses from the pulse generator 248 into a width code for the character 232, and this width code is sent to a line test and register section 252. In the line test and register section, the width code is employed in conventional line width control and justification steps which constitute no major portion of this invention. For example, the width of the character from the converter 250 is substracted from the width remaining in the line and the result is sent to the line measure display 26 in FIG. 1. The character width is also employed for justification purposes conventional to photocomposing machines to automatically determine whether a new line should be started or whether the character may be set in a line presently being printed. Once these determinations are made and the actions in response thereto completed, a set reset unit 254 delivers a pulse to the input logic 222 for the counter 224 and this counter is now activated. The position code for the character 232 previously set in the counter 220 is set in the counter 224, and when the pulse from the wide timing mark 154 is provided from the photo diode 100 to the terminal 228, the input logic section 222 causes the counter 224 to begin counting toward zero. The counter 224 operates in a manner identical to that previously described in connection with the counter 220, and zeroes when the timing pulse 234 passes between the exciter lamp 94 and the photo diode 102. Again, the next succeeding timing pulse 236 initiates a width measurement by causing the counter 224 to overflow and activate a flip flop 256. Like the flip flop 238, the flip flop 256 has a terminal 258 which is connected to receive pulses from either the photo diode 98 or the photo diode 102. Thus, the width pulse 242 passes through the flip flop 256 to enable a gate 260, and this gate now passes pulses from the pulse generator 248 to a converter 262. The gate 260 is closed by a second pulse resulting from the width mark 244, and pulses indicative of width are now present in the converter 262. The next timing mark 230 causes a second overrun output from the counter 224 which deactivates the flip flop 256 and activates a flash control 264 to illuminate the flash control lamp 104. This causes printing of the character 232 on the sensitive film 106.

The converter 262 operates in a manner similar to the converter 250 to convert the width pulses to a width code which is then furnished to a motor control unit 266. Immediately subsequent to the operation of the flash 104, the motor control 266 causes the stepping motor 66 to move the carriage 64 for a distance determined by the width code from the converter 262.

Ideally, the typefont 80 will also carry a set size code for the characters on the font. This set size code may be placed anywhere in the width code tracks for the fonts A,B, and C, but is ideally placed before the width code for the letter A. Thus, in tracks 150 and 152, the set size code marks may be the pair indicated at 268 and 270, and similar set size code marks may appear at 272 and 274 in the width tracks 134 and 138. When a font is initially chosen, the font select code through the keyboard register 196 causes the read and memory unit 202 to initially output a position code for the set size code marks for the selected font. This set size code location is set into the counter 220 in the manner previously described in connection with character position codes, and the counter counts down to zero to enable the flip flop 238. If, for example, characters in the font 130 have been selected, the distance between the pair of set size code marks 272 is sensed and the pulse generator 248 provides pulses to the converter 250 indicative of this distance. The converter 250 provides set size codes to a set code register 276 which stores the set code for future use. When the read and memory unit 202 is not outputting character position logic for a selected font, it switches back to provide the set size code mark position for that font. Thus the code in the set code register 276 can be updated when characters are not being set.

The motor control unit 266 subsequently uses the set size code stored in the set code register 276 in combination with the width code from the converter 262 to access a lookup memory to obtain an absolute value; namely the number of steps to be provided by the stepping motor 66.

In summary, it is apparent that the circuit in FIG. 9 obtains the character width on a first revolution of the font so that all justification, line tests, and similar functions of the photocomposing machine involving character width may be accomplished, and on a subsequent revolution of the font, the character width is again obtained, the character is projected, and the character width is then used to escape the carriage.

I claim:

1. In a phototypesetting machine, a character carrier bearing in combination a group of characters, a position mark for each character in said group and a width indication means for each character in said group positioned between the position mark for that character and a position mark for the next preceding character, said width indication means operating to provide character width information and including two spaced marks for each character, the distance between said two marks being indicative of character width, projection means for transmitting the image of a character passing through a projection position, character drive means for moving said characters, position marks and width indication means at a substantially constant speed consecutively past said projection position, and width sensing means for sensing said moving width indication means and deriving character width information from said width indication means.

2. The phototypesetting machine of claim 1 wherein said character carrier is formed by a plurality of removable character bearing sections, each said character bearing section having a group of characters, a position mark for each such character in the group, and a width indication means for each character in the group.

3. The phototypesetting machine of claim 2 wherein said character sections are formed whereby the characters, position marks, and width indication means on any section may be brought into aligned relationship with the characters, position marks, and width indication means on the remaining character bearing sections, said drive means including character carrier mounting means adapted to receive and maintain said character sections in said aligned relationship.

4. The phototypesetting machine of claim 1 wherein said character carrier is disc shaped with said characters, width indication means and position marks being formed into a plurality of concentric rings.

5. The phototypesetting machine of claim 4 wherein said character carrier is divided into at least first and second sections, said first section including first characters forming at least a first font arranged along at least one arcuate segment of a circle and width indication means and position marks for said first characters arranged respectively to form concentric arcuate segments of concentric circles, said second section including second characters forming at least a second font arranged along at least one arcuate segment of a circle and width indication means and position marks for said second characters arranged respectively to form concentric arcuate segments of concentric circles, the arcuate character, width indication means and position mark arcuate segments of said first and second sections mating to form said plurality of concentric rings.

6. The phototypesetting machine of claim 5 wherein the characters in said first section form two fonts, a first font being arranged to form a first arcuate segment of a circle and a second font being arranged to form a second arcuate segment of a circle concentric with said first arcuate segment.

7. The phototypesetting machine of claim 6 wherein the characters in said second section form a single third font, one half of the characters in said third font being arranged to form a third arcuate segment of a circle and the remaining characters in said third font being arranged to form a fourth arcuate segment of a circle concentric with said third arcuate segment, said first and third and second and fourth arcuate segments mating to form two concentric character rings.

8. The phototypesetting machine of claim 7 wherein said character carrier includes a single position ring of position marks for both concentric character rings and two width rings of width indication means, one width ring for each of the concentric character rings.

9. The phototypesetting machine of claim 8 wherein the position marks and width indication means for said first and second fonts are formed on said first section with said position marks forming a single arcuate segment of a circle and said width indication means forming arcuate segments of two concentric circles, and the position marks and width indication marks for said third font are formed on said second section with said position marks forming a single arcuate segment of a circle and said width indication means forming arcuate segments of two concentric circles.

10. The phototypesetting machine of claim 9 wherein the characters, width indication means and position marks in said first section are arranged along 240° arcuate segments of concentric circles and the characters, width indication means and position marks in said second section are arranged along 120° arcuate segments of concentric circles.

11. The phototypesetting machine of claim 5 wherein said character carrier includes first and second discs of substantially equal diameter, said first font and the width indication means and position marks for said first characters being formed on said first disc and said second font and the width indication means and position marks for said second characters being formed on said second disc.

12. The phototypesetting machine of claim 1 which includes mark sensing means for sensing said position marks and providing an output in response to each position mark passing said mark sensing means, position code means for providing an output indicative of the position of a selected character, and comparison means for receiving the outputs of said position code means and said mark sensing means, said comparison means operating to activate said width sensing means.

13. The phototypesetting machine of claim 12 wherein said comparison means operates to activate said projection means.

14. The phototypesetting machine of claim 12 wherein said characters and the width indication means and position marks therefor are arranged in spaced lines to pass consecutively past said projection means, width sensing means and mark sensing means respectively, the width indication means for a character being positioned between the position mark for that character and a position mark for the next preceding character.

15. The phototypesetting machine of claim 14 wherein said comparison means activates said width sensing means when the position mark preceding the position mark for a selected character is sensed by said mark sensing means.

16. The phototypesetting machine of claim 15 wherein said width indication means is formed by two spaced width marks, the distance between said width marks being indicative of character width, said width sensing means including means to measure the time between said spaced width marks and provide an output indicative of said time.

17. The phototypesetting machine of claim 15 which includes carriage means for mounting said character carrier, projection means and character drive means, said carriage means being adapted for straight line movement, carriage drive means for moving said carriage means, said width sensing means operating when activated to provide an output in response to said width information means to control said carriage drive means.

18. The phototypesetting machine of claim 1 wherein said character carrier bears a set size indicator means for providing a set size indication for said characters.

19. The phototypesetting machine of claim 18 wherein said set size indicator means is formed by two spaced marks for each font of characters in said group of characters, the distance between said marks being indicative of the set size for said font of characters.

20. A character carrier for a phototypesetting machine comprising a disc shaped assembly bearing characters for photographic projection formed into at least one character ring, said character carrier being divided into at least first and second sections, said first section including characters forming two fonts, a first font being arranged to form a first arcuate segment of a circle and a second font being arranged to form a second arcuate segment of a circle concentric with said first arcuate segment, and said second section including second characters forming a third font arranged along two arcuate segments of a circle, the arcuate segments of said first and second sections mating to form at least two character rings.

21. The character carrier of claim 20, wherein the characters in said second section form a single third font, one half of the characters in said third font being arranged to form a third arcuate segment of a circle and the remaining characters in said third font being arranged to form a fourth arcuate segment of a circle concentric with said third arcuate segment, said first and third and second and fourth arcuate segments mating to form two concentric character rings.

22. The character carrier of claim 20 wherein said first section is separable from said second section.

23. The character carrier of claim 22 wherein said first section is formed on a first disc and said second section is formed on a second disc of a diameter substantially equal to that of said first disc, said discs including alignment means to permit said discs to be superimposed to form at least one character ring.

24. The character carrier of claim 20 which includes set size indicator for each font of characters formed on said first and second sections.

25. The character carrier of claim 24 wherein each said set size indicator means is formed by two spaced marks for each font, the distance between said marks being indicative of the set size for the characters in the corresponding font.

26. A character carrier for a phototypesetting machine comprising a disc bearing light transmitting characters for photographic projection, said characters being arranged along at least one arcuate segment of a circle on an opaque background, said opaque background extending over said disc to define an opaque section ending along radial lines from the center of the disc through the ends of said arcuate segment, the remainder of the disc being substantially transparent and width indication means for each character formed on the disc, said width indication means operating to provide character width information and being arranged along at least one arcuate segment of a circle concentric with said arcuate segment of characters, said disc including a central aperture formed therein and three mounting holes formed in said disc equally spaced from said central aperture and centered on radial lines forming angles of substantially 120° at the center of the disc, two of said mounting holes being centered on the border between the opaque and transparent sections of said disc.

27. The character carrier of claim 26 wherein said disc is provided with three locking holes spaced from the central aperture thereof, each locking hole being centered between two mounting holes.

28. A character carrier for a photosetting machine comprising a unitary disc bearing characters for photographic projection, said characters being arranged along two arcuate aligned segments of concentric circles extending for less than 360 degrees, and character width indication means for each character formed on said unitary disc in arcuate segments concentric and aligned with the arcuate segments formed by said characters, said width indication means operating to provide character width information, said disc being transparent in a section between the ends of said arcuate segments.

29. The character carrier of claim 28 wherein said characters form two complete fonts, one font being contained in each arcuate segment of characters.

30. The character carrier of claim 29 wherein said arcuate segments of characters and width indication means extend concentrically for substantially 240°.

31. The character carrier of claim 28 wherein said characters form one font, each of said arcuate segments of characters containing one half the characters in said font.

32. The character carrier of claim 31 wherein one of said arcuate segments of characters contains upper case characters and the remaining arcuate segment of characters contains lower case characters.

33. The character carrier of claim 31 wherein said arcuate segments of characters and width indication means extend concentrically for substantially 120°.

34. The character carrier of claim 1 wherein said disc bears a plurality of spaced position marks arranged along an arcuate segment of a circle and concentric with said arcuate segments of characters and character width indication means, each position mark being positioned adjacent a character in each of said arcuate segments of characters.

35. The character carrier of claim 34 wherein the width indication means for a character is positioned between the position mark for that character and the position mark for the next preceding character.

36. In a phototypesetting machine, a disc shaped character carrier bearing in combination a group of characters, a position mark for each character in said group and a width indication means operating to provide character information, said character carrier being divided into at least first and second discs of substantially equal diameter, said first disc including first characters forming at least a first font arranged along at least one arcuate segment of a circle and width indication means and position marks for said first characters arranged respectively to form concentric arcuate segments of concentric circles, said first characters and width indication means and position marks therefor being light transmitting and formed on a substantially opaque background which extends over a section of said first disc between the ends of the concentric arcuate segments formed by said first characters and the width indication means and position marks therefor, the remainder of said first disc being transparent, said second disc including second characters forming at least a second font arranged along at least one arcuate segment of a circle and width indication means and position marks for said second characters arranged respectively to form concentric arcuate segments of concentric circles, the arcuate character width indication means and position mark arcuate segments of said first and second discs mating to form a plurality of concentric rings, projection means for transmitting the image of a character passing through a projection position, character drive means for moving said characters at a substantially constant speed consectively past said projection psotion, and width sensing means for sensing character width information from said width indication means.

37. The phototypesetting machine of claim 36 wherein said second characters and the width indication means and position marks therefor are light transmitting and formed on a substantially opaque background which extends over a section of said second disc between the ends of the concentric arcuate segments formed by said first characters and the width indication means and position marks therefor, said substantially opaque background on the second disc defining the second section, the remainder of said second disc being transparent.

38. The phototypesetting machine of claim 37 wherein said first and second discs include alignment means, said drive means including disc mounting means adapted to receive said first and second discs in superimposed relationship and cooperating with said alignment means to position the transparent portion of the uppermost disc over the characters, position marks and width indication means on the lowermost disc while mating the first and second sections on the first and second disc to form said plurality of concentric rings.

39. A character carrier for a phototypesetting machine comprising a disc shaped assembly bearing characters for photographic projection formed into at least one character ring, said character carrier including a first section formed on a first disc and a second section formed on a second disc, said first section including first characters forming at least one arcuate segment of a circle, the first characters being light transmitting and formed on a substantially opaque background on said first disc defining said first section and the remainder of said first disc being transparent, said second section including second characters forming at least a second font arranged along at least one arcuate segment of a circle, the second characters being light transmitting and formed on a substantially opaque background which extends over a section of said second disc between the ends of the arcuate segment formed by said second characters, said substantially opaque background on said second disc defining said second section and the remainder of said second disc being transparent, the arcuate segments of said first and second sections mating to form at least one character ring, said first and second discs being of substantially equal diameter and including alignment mean to permit said discs to be superimposed to form at least one character ring.

40. The character carrier of claim 39 wherein the first characters in said first section form two fonts, a first font being arranged to form a first arcuate segment of a circle and a second font being arranged to form a second arcuate segment of a circle concentric with said first arcuate segment.

41. The character carrier of claim 40 wherein the characters in said second section form a single third font, one half of the characters in said third font being arranged to form a third arcuate segment of a circle and the remaining characters in said third font being arranged to form a fourth arcuate segment of a circle concentric with said third arcuate segment, said first and third and second and fourth arcuate segments mating to form two concentric character rings.

42. The character carrier of claim 41 which includes a single position ring of light transmitting position marks for both concentric character rings and two width rings of light transmitting width indication means for providing character width information, one width ring for each of the concentric character rings.

43. The character carrier of claim 42 wherein the position marks and width indication means for said first and second fonts are formed on said first section with said position marks forming a single arcuate segment of a circle and said width indication means forming arcuate segments of two concentric circles, and the position marks and width indication marks for said third font are formed on said second section with said position marks forming a single arcuate segment of a circle and said width indication means forming arcuate segments of two concentric circles.

44. The character carrier of claim 43 wherein the first characters, width indication means, and position marks in said first section are arranged along 240° arcuate segments of concentric circles and the second characters, width indication means and position marks in said second section are arranged along 120° arcuate segments of concentric circles.

45. The character carrier of claim 44 wherein said alignment means for said first and second discs include a center aperture formed through the center of each disc, and three mounting holes formed in each disc equally spaced from said center aperture and centered on radial lines forming angles of 120° at the center of each disc, two of said mounting holes being centered on the border between the opaque and transparent section of each disc.

46. The character carrier of claim 45 wherein said alignment means include three locking holes on each disc spaced from the center aperture thereof, each locking hole being centered between two mounting holes.

47. A character carrier for a phototypesetting machine comprising a disc bearing light transmitting characters for photographic projection, said characters being arcuately arranged on an opaque background, a position mark for each character, a width indication means for each character positioned between the position mark for that character and a position mark for the next preceding character, said width indication means operating to provide character width information and including two spaced marks for each character, the distance between said two marks being indicative of character width, said position marks and width indication means being arranged concentrically with said characters, and set size indicator means for providing a set size indication for said characters, said set size indicator means being formed by two spaced set size marks for a group of characters, the distance between said set size marks being indicative of the set size for said group of characters.

* * * * *